US012545340B2

(12) United States Patent
Grenzi et al.

(10) Patent No.: US 12,545,340 B2
(45) Date of Patent: Feb. 10, 2026

(54) TRACK ROLLER FOR GUIDING A TRACK OF A TRACKED VEHICLE AND UNDERCARRIAGE OF A TRACKED VEHICLE

(71) Applicants: Berco S.p.A., Copparo/Ferrara (IT); thyssenkrupp AG, Essen (DE)

(72) Inventors: Francesco Grenzi, Ferrara (IT); Enrico Maggiolini, Ferrara (IT)

(73) Assignees: Berco S.p.A., Copparo/Ferrara (IT); thyssenkrupp AG, Essen (DE)

(*) Notice: Subject to any disclaimer, the term of this patent is extended or adjusted under 35 U.S.C. 154(b) by 475 days.

(21) Appl. No.: 18/272,894

(22) PCT Filed: Jan. 14, 2022

(86) PCT No.: PCT/EP2022/050784
§ 371 (c)(1),
(2) Date: Jul. 18, 2023

(87) PCT Pub. No.: WO2022/152873
PCT Pub. Date: Jul. 21, 2022

(65) Prior Publication Data
US 2024/0083528 A1 Mar. 14, 2024

(30) Foreign Application Priority Data

Jan. 18, 2021 (IT) .................. 102021000000725

(51) Int. Cl.
*B62D 55/15* (2006.01)
*B62D 55/10* (2006.01)

(52) U.S. Cl.
CPC ............. *B62D 55/15* (2013.01); *B62D 55/10* (2013.01)

(58) Field of Classification Search
CPC ....... B62D 55/145; B62D 55/15; B62D 55/14
See application file for complete search history.

(56) References Cited

U.S. PATENT DOCUMENTS 2,054,532 A 9/1936 Baker et al.
2,179,860 A * 11/1939 Panzegrau ............ B62D 55/15
384/368

(Continued)

FOREIGN PATENT DOCUMENTS

CN 105873815 A 8/2016
CN 108778913 A 11/2018
(Continued)

OTHER PUBLICATIONS

English Translation of International Search Report issued in PCT/EP2022/050784, dated Apr. 6, 2022.

*Primary Examiner* — Valentin Neacsu
*Assistant Examiner* — Hosam Shabara
(74) *Attorney, Agent, or Firm* — thyssenkrupp North America, LLC

(57) ABSTRACT

The disclosure relates to a track roller for guiding a track of a tracked vehicle including a shaft extending in an axial direction, the shaft having a central portion and two axial end portions axially adjacent to the central portion on each side, wherein a transversal through-hole is provided in each axial end portion of the shaft, a roller shell mounted on the central portion of the shaft in a rotatable manner, two annular retainer caps fitted to the shaft, and sealing arrangements located between each of the retainer caps and the roller shell, wherein the shaft is flattened at least in a region of its axial end portions in such a way that at least one support surface which includes the through-hole is provided at each end portion for mounting the track roller to an undercarriage of the tracked vehicle, and the retainer caps are arranged within the central portion of the shaft in their entirety, and an undercarriage of a tracked vehicle comprising such a track roller.

10 Claims, 4 Drawing Sheets

(56) References Cited

U.S. PATENT DOCUMENTS

| | | | | |
|---|---|---|---|---|
| 4,355,988 A | * | 10/1982 | Klaus | B62D 55/15 384/418 |
| 4,427,311 A | * | 1/1984 | Takenaka | F16C 33/74 384/418 |
| 5,553,931 A | * | 9/1996 | Diekevers | B62D 55/15 305/193 |
| 5,803,558 A | * | 9/1998 | Ketting | B62D 55/14 305/136 |
| 6,213,471 B1 | | 4/2001 | Anderson et al. | |
| 9,409,613 B2 | * | 8/2016 | Hakes | B62D 55/202 |
| 12,049,266 B2 | * | 7/2024 | Umbach | B62D 55/092 |
| 2011/0121643 A1 | | 5/2011 | Mulligan | |
| 2017/0050687 A1 | * | 2/2017 | Kaufmann | B62D 55/088 |
| 2017/0088204 A1 | * | 3/2017 | Brooks | B62D 55/14 |
| 2019/0077474 A1 | | 3/2019 | Nagaoka | |

FOREIGN PATENT DOCUMENTS

| | | |
|---|---|---|
| EP | 0 128 877 A2 | 12/1984 |
| JP | 4013487 B2 | 11/2007 |
| KR | 2019870004010 Y1 | 12/1987 |
| KR | 1020110058651 A | 6/2011 |
| KR | 1020180107251 A | 10/2018 |
| TW | 201538376 A | 10/2015 |
| WO | 2018/138647 A2 | 8/2018 |

* cited by examiner

Fig. 3a                    Fig. 3b

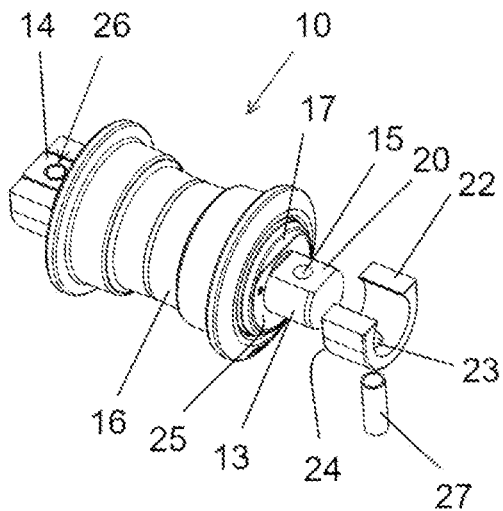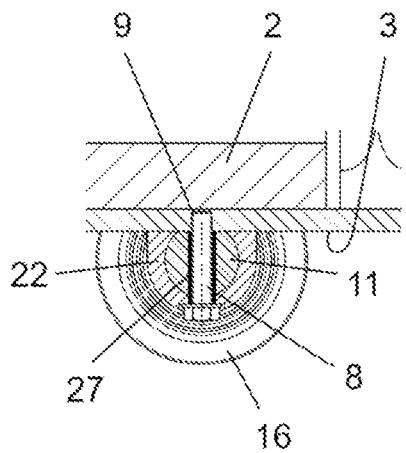
Fig. 4a Fig. 4b
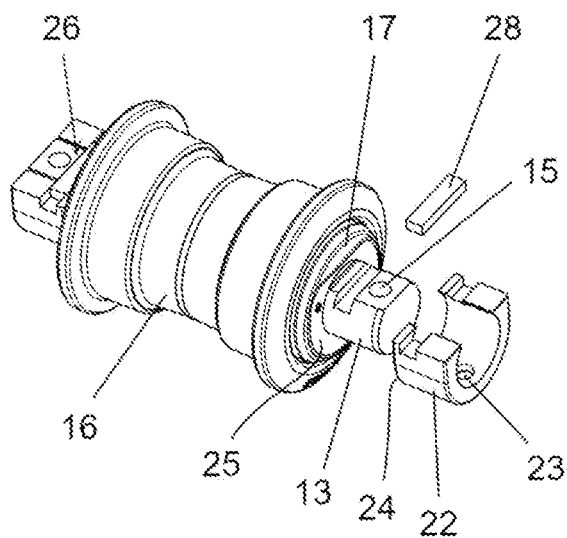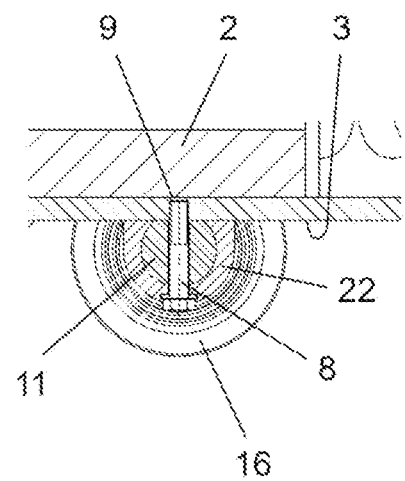
Fig. 5a Fig. 5b

TRACK ROLLER FOR GUIDING A TRACK OF A TRACKED VEHICLE AND UNDERCARRIAGE OF A TRACKED VEHICLE

CROSS REFERENCE TO RELATED APPLICATIONS

This application is a U.S. National Stage Entry of International Patent Application Serial Number PCT/EP2022/050784, filed Jan. 14, 2022, which claims priority to Italian Patent Application No. IT 102021000000725, filed Jan. 18, 2021, the entire contents of all of which are incorporated herein by reference.

FIELD

The present disclosure generally relates to a track roller for guiding a track of a tracked vehicle.

BACKGROUND

Tracked vehicles are in widespread use, for example in the construction, mining and forestry industry. The undercarriage of tracked vehicles utilizes track assemblies rather than wheels, to provide ground-engaging propulsion. Such track assemblies include an endless track comprising a loop of coupled track links. On their exterior surfaces, the track links support ground-engaging track shoes. The interior surfaces of the track links travel about rotatable track-engaging elements, as for example drive sprockets, idlers, tensioners and track rollers.

The track rollers of each endless track are positioned in a linear fashion on a track frame of the undercarriage. The track rollers guide the track links of the track shoes currently engaging the ground in a linear direction. This way, the track rollers provide a path for the endless track to follow and allow for easy, guided movement of the track when the tracked vehicle is in use. In particular, in heavy tracked vehicles, e.g. earthmoving machines like dozers and excavators, the track rollers must be able to absorb large forces along their axis in order to reliably guide the track in operation.

From US 2017/0050687 A1 a track-roller of a track-type machine is known. The track roller contains a stationary shaft within the center of the track roller. Above the center portion of the stationary shaft, a roller shell is present that may rotate around the shaft. The roller shell has notched levels that prevent the track chain from slipping off the track rollers. Above each end section of the stationary shaft, a stationary collar is present that secures the roller shell on the shaft. The stationary shaft has a circular cross-section throughout its length. A locking pin running perpendicular to the common axis of the track roller is provided, wherein the locking pin travels through a first portion of the stationary collar into and through the stationary shaft and ends through a second portion of the stationary collar. The track roller is to be affixed to a track frame of an undercarriage by means of four bolts extending through two through-holes provided in each of the stationary collars on both sides adjacent to the end section of the shaft held by the collar. Disadvantages of the known track roller are the complicated and time-consuming mounting procedure requiring four bolts per track roller and the narrow range of application due to the fact that each track roller can only be mounted on an undercarriage with a specific drilling pattern matching with the through-holes in the stationary collars.

Thus a need exists to provide a track roller of a tracked vehicle that can be affixed to an undercarriage with a reduced mounting effort and is usable in combination with a wide range of undercarriages at the same time, and an undercarriage with such a track roller affixed thereto.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 3a, 3b show schematically a detailed depiction of one of the track rollers of FIG. 2 in a perspective and a side view, respectively;

FIGS. 4a, 4b show the track roller according to the first embodiment in combination with a U-shaped collar connected to its end portions by a keyed connection in a perspective, partially exploded view and in a sectional view of the mounted state, respectively;

FIGS. 5a, 5b show another embodiment of the track roller according to the disclosure in combination with a U-shaped collar connected to its end portions by a different keyed connection in a perspective, partially exploded view and in a sectional view of the mounted state, respectively.

DETAILED DESCRIPTION

Figure 1:
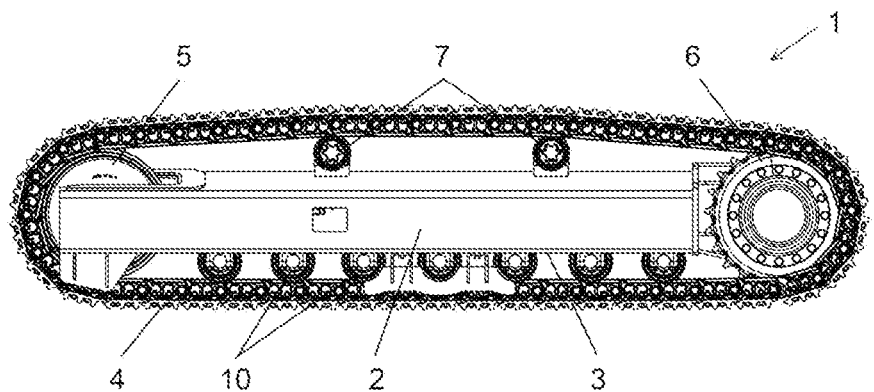
FIG. 1 shows an undercarriage according to the disclosure in a side view.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Hereby, a track roller for guiding a track of a tracked vehicle is provided, that comprises a shaft extending in an axial direction, wherein the shaft has a central portion and two axial end portions axially adjacent to the central portion on each side, wherein a transversal through-hole is provided in each axial end portion of the shaft. The track roller further comprises a roller shell mounted on the central portion of the shaft in a rotatable manner, two annular retainer caps fitted to the shaft, and sealing arrangements located between each of the retainer caps and the roller shell. According to the disclosure the shaft is flattened at least in a region of its axial end portions in such a way that at least one support surface which includes the through-hole is provided at each end portion for mounting the track roller to an undercarriage of the tracked vehicle, and the retainer caps are arranged within the central portion of the shaft in their entirety.

By limiting the extension of the retainer caps to the central portion of the shaft, the end portions of the shaft can be used directly for mounting the track roller to an undercarriage. To this end, according to the disclosure the track roller is provided with support surfaces on its axial end portions made by at least partly flattening the shaft in the region of its end portions. The track roller is configured to be mounted to an undercarriage by only two bolts inserted into the transversal through-holes in its end portions. The transversal bolted connections pass through the support surfaces and a tensioning force that creates a frictionally engaged connection between the track roller and the undercarriage. Thus, the bolts themselves are not subject to the axial forces exerted on the track rollers during operation of the vehicle but are only exerted to a well-defined tensioning force. Therefore, the track roller according to the disclosure, in spite of being fixed to the undercarriage by only two bolts, is suitable for use even in heavy machinery, like bulldozers or excavators.

In preferred embodiments, the retainer caps are press-fitted to the central portion of the shaft. The press-fit of the retainer caps to the shaft helps to maintain a fixed axial position of the retainer caps on the shaft under axial loads of the roller shell.

Further, it is preferred that a form-locked engagement of the retainer caps and shaft is provided by a locking element. The locking element can be a snap ring engaged in a circumferential grove of the roller shaft, for example. The locking element could also be attached to the shaft or the retainer caps. In general, any form of positive retention mechanism between retainer caps and shaft can be used. Form-locked engagement between retainer caps and shaft further increases the axial forces that can be absorbed by the retainer caps.

The object is further achieved by an undercarriage of a tracked vehicle comprising at least one track frame providing a platform for track rollers, a plurality of track rollers affixed to the platform and an endless track guided by the track rollers. According to the disclosure, the track rollers are of the inventive design described above and the support surface provides an abutment face for the track roller on the platform.

In preferred embodiments, the track rollers are affixed to the platform by two bolts extending through the through-holes in the end portions of the shaft into fixing holes provided in the platform.

In further preferred embodiments, generally U-shaped collars are arranged circumferentially around the end portions of the shaft, the collars having a through-hole in alignment with the through-hole of the shaft. The U-shaped collars can be used to stabilize the shaft in the regions of its end portions.

Further, it may be provided that the collars have a flat axial end face configured for a sliding interaction with a flat axial end face of the retainer caps, in order to absorb axial forces acting on the retainer caps during operation of the undercarriage. In this case, the collars are designed to slidingly support the retainer caps in their axial position.

Preferably, the collars are fixed to the end portions at least in an axial direction by the means of a keyed connection. The keyed connection helps to pass on axial forces absorb by the collar to the shaft, in particular without exerting stress on the bolts used to fix the track roller to the undercarriage. For example, the keyed connection can be provided by a tube inserted into the aligned through-holes in the collar and the shaft. In other embodiments, the keyed connection is provided by a key that connects the legs of U-shaped collar and is inserted into a continuous groove or hole traversing the legs of the U-shaped collar and the respective end portion of the shaft.

In specific embodiments, the collars are provided with mounting holes extending along the legs of the U-shape for mounting the collars to the platform by a bolted connection. By using the track roller in combination with such a collar, the track roller can be mounted on an existing undercarriage with a given drilling pattern in the track frame by choosing a collar with a matching positioning and spacing its mounting holes. Thus, in combination with a matching collar, the track roller is suitable for installation on a large variety of track frames with different drilling patterns. The track roller thus allows for standardization and can be used as a very versatile spare part.

In the drawings same parts are consistently identified by the same reference signs and are therefore generally described and referred to only once.

In FIG. 1 an undercarriage 1 of a tracked vehicle is shown. The undercarriage 1 comprises at least one track frame 2 that provides a platform 3 for track rollers 10. A plurality of track rollers 10 is affixed to the platform 3 to guide and an endless track 4.

The track rollers 10 guide the endless track 4 in a bottom, ground-engaging portion of the track 4. At its turning ends, the loop of the endless track 4 is guided by a drive sprocket 6 used to drive the track 4 and an idler 5. The top portion of the endless track 4 is carried by carrier rollers 7. Drive sprocket 6, Idler 5 and carrier rollers 7 are preferably all mounted on the same track frame 2 to which the track rollers 10 are affixed.

Figure 2:
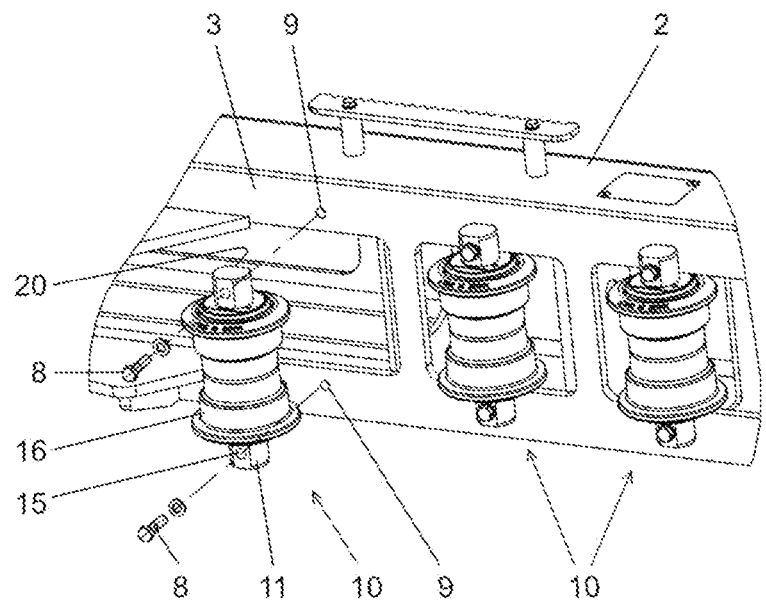
FIG. 2 shows a plurality of track rollers according to a first embodiment that are fixed to the track frame of the undercarriage of FIG. 1 in a perspective, partially exploded view.

FIG. 2 shows a detailed view of the fixation of the track rollers 10 to the platform 3 of the track frame 2. The track rollers 10 are affixed to the platform 3 by two bolts 8 that extend through through-holes 15 in end portions 13, 14 of a shaft 11 of the track roller 10 into fixing holes 9 provided in the platform 3. The shaft 11 is flattened at its axial end portions 13, 14 in such a way that a support surface 20 which includes the through-hole 15 is provided at each end portion 13, 14 for mounting the track roller 10 to the track frame 2 of the undercarriage 1 of the tracked vehicle. It can be seen in FIG. 2 that in a mounted state of the track rollers 10 the support surface 20 provides an abutment face for the track roller 10 on the platform 3 of the track frame 2.

Figure 3C:
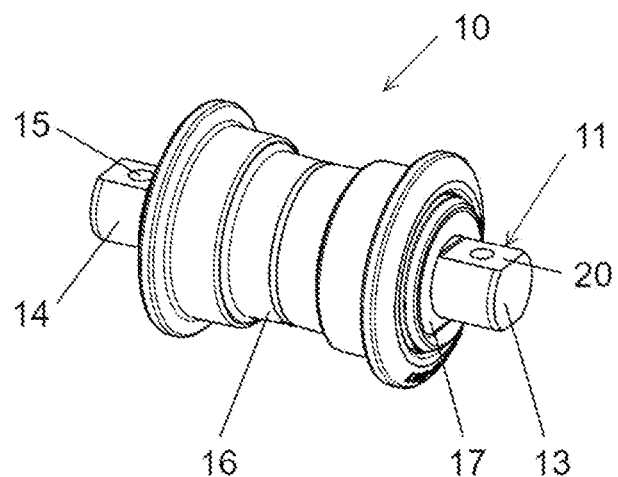
FIG. 3c shows a partial longitudinal section of the track roller of FIGS. 3a and 3b.
Figure 3C:
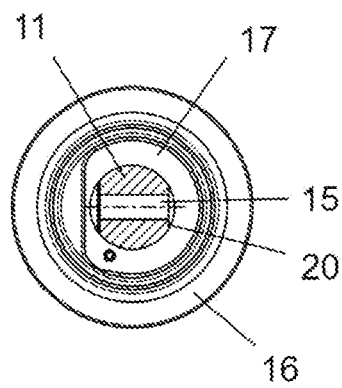
Figure 3C:
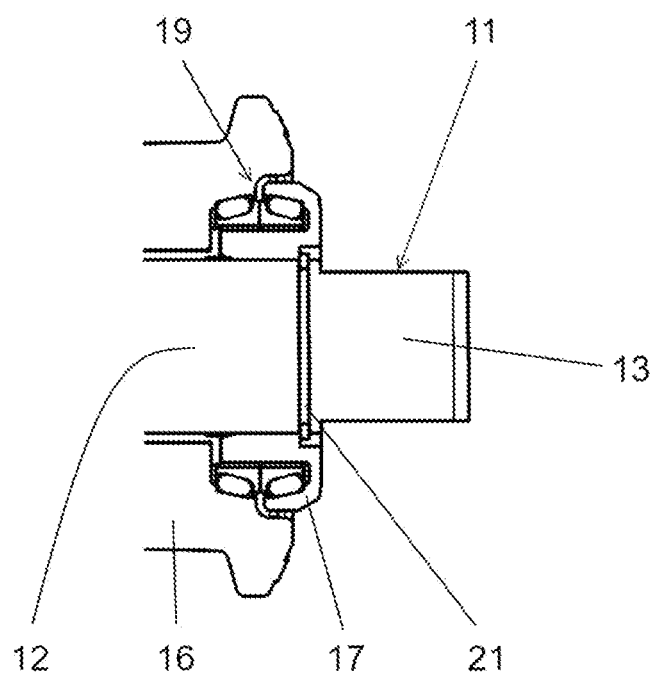

In FIGS. 3a to 3c the track roller 10 for guiding the track 4 of a tracked vehicle according to FIGS. 1 and 2 is shown in more detail. The track roller 10 comprises a shaft 11 extending in an axial direction of the track roller 10. The shaft 11 has a central portion 12 (see FIG. 3c) and two axial end portions 13, 14 that are disposed axially adjacent to the central portion 12 on each side. In each axial end portion 13, 14 of the shaft 11 a transversal through-hole 15 is provided.

The track roller 10 further comprises a roller shell 16 that is mounted on the central portion 12 of the shaft 11 in a rotatable manner. Preferably, the roller shell 16 is supported on the central portion 12 by means of a sliding bearing. However, rolling bearings could be used for this purpose, as well.

The roller shell 16 typically has a contoured outer surface that is configured to engage with an inner surface of the endless track 4 in such a way, that the track 4 is held in a predefined axial position with respect to the track roller's axis. Thus, the track rollers 10 guide the track 4 in a linear motion. In particular, the roller shell 16 may include at least one circumferential rim and/or groove. In the embodiment shown in FIGS. 3a to 3c the roller shell 16 includes two lateral rims and a central groove for guiding the track 4.

In addition, the track roller 10 comprises two annular retainer caps 17, 18 fitted to the shaft 11, and sealing arrangements 19 located between each of the retainer caps 17, 18 and the roller shell 16. As shown in FIG. 3c the sealing arrangements 19 are preferably designed as sliding metal face seals. In this case, two metal sealing rings, that are supported in a flexible manner via elastic sealing rings on the retainer caps 17, 18 and the roller shell 16, respectively, face each other on a transverse ring-shaped sliding surface.

At least in a region of its axial end portions 13, 14 the shaft 11 is flattened in such a way that at least one support surface 20 which includes the through-hole 15 is provided at each end portion 13, 14 for mounting the track roller 10 to an undercarriage 1 of the tracked vehicle. The retainer caps 17, 18 are arranged within the central portion 12 of the shaft 11 in their entirety. In particular, the retainer caps 17, 18 do not extend up to the through-holes 15 in the end portions 13, 14 of the shaft 11. Preferably, the retainer caps 17, 18 are ring-shaped caps. The retainer caps 17, 18 serve the purpose to close the side surfaces of the roller shell 16 and to absorb axial forces exerted on the roller shell 16 when guiding the track 4.

Preferably, the retainer caps 17, 18 are press-fitted to the central portion 12 of the shaft 11. In addition or alternatively, a form-locked engagement of the retainer caps 17, 18 and shaft 11 is provided by a locking element 21. For example, in FIG. 3c, a snap ring is used as a locking element 21 to provide a form-locked engagement of retainer cap 17 and shaft 11. The snap ring is inserted into a circumferential groove of the shaft 11 and protrudes in a radial direction from the groove. Thereby axial creep of the retainer cap 17 towards the end portion 13 is inhibited.

The form-locked engagement using a snap ring as shown in FIG. 3c is an example only. Any form of a positive retention locking may be used as a form-locked engagement, as well. The locking element 21 may be formed integrally with the retainer cap 17, 18 or the shaft 11.

In FIG. 4a the track roller 10 according to the first embodiment is shown in combination with a generally U-shaped collar 22. When mounted to the track frame 2 (FIG. 4b) an undercarriage for a tracked vehicle is formed, wherein the generally U-shaped collars 22 are arranged circumferentially around the end portions 13, 14 of the shaft 11 and the collars 22 have a through-hole 23 in alignment with the through-hole 15 of the shaft 11.

As shown in FIG. 4a the collars 22 preferably have a flat axial end face 24 configured for a sliding interaction with a flat axial end face 25 of the retainer caps 17, 18, in order to absorb axial forces acting on the retainer caps 17, 18 during operation of the undercarriage 1.

Further, the collars 22 can be fixed to the end portions 13, 14 at least in an axial direction by means of a keyed connection 26. The keyed connection 26 fixes the relative axial position of the collar 22 on the shaft 11 and is configured to absorb the axial forces transferred from the roller shell 16 to the retainer caps 17, 18. Thereby, the bolts 8 used to fix the track roller 10 to the track frame 2 are kept clear from shearing stresses at the interface of collar 22 and shaft 11.

In FIGS. 4a and 4b an example of a keyed connection 26 is shown, wherein the keyed connection 26 is provided by a tube 27 that is inserted into the aligned through-holes 23, 15 in the collar 22 and the shaft 11.

In FIGS. 5a and 5b a second embodiment of the track roller 10 is shown in order illustrate a different example of a keyed connection 26 between U-shaped collar 22 and shaft 11. In this case, a key 28 is used to connect the legs of U-shaped collar 22. The key 28 is inserted into a continuous groove traversing the legs of the U-shaped collar 22 and the respective end portion 13, 14 of the shaft 11.

In all other respects, the description of the first embodiment is applicable to the second embodiment shown in FIGS. 5a and 5b accordingly.

Figure 6A:
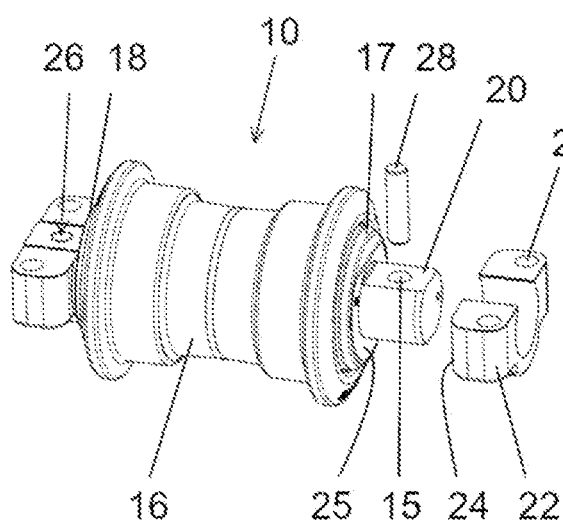
FIGS. 6a, 6b show the track roller in combination with a U-shaped collar having mounting holes extending along the legs of the U-shape, in a perspective, partially exploded view and a top view, respectively.
Figure 6B:
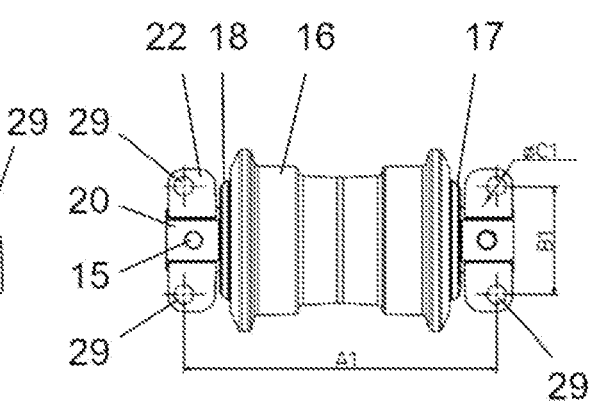

FIGS. 6a and 6b show the track roller 10 according to the first embodiment in combination with a generally U-shaped collar 22 that is provided with two mounting holes 29 extending along the legs of the U-shape for mounting the collars 22 to the platform 3 of a track frame 2 by a bolted connection.

By means of such U-shaped collars 22 the same track roller 10 can be mounted to existing track frames 2 having different drilling patterns of fixing holes 9. The collar 22 serves as an adaptor that allows for standardization of the track roller 10. In particular, the collars 22 can be provided with varying axial distances A1, transversal distances B1 and/or diameters C1 of the mounting holes 29. By choosing a collar 22 that matches the drilling pattern of the track frame 2, the track roller 10 can be mounted to that track frame 2 as a versatile spare part. Preferably, the collar 22 and the shaft 11 are connected by a keyed connection 26, that may be provided by a pin-shaped key 28 inserted into the aligned, transversal through-holes 23, 15 in the collar 22 and the shaft 11.

The methods and systems of the present disclosure, as described above and shown in the drawings provide for a track roller for guiding a track of a tracked vehicle with superior properties. While the apparatus and methods of the subject disclosure have been showing and described with reference to embodiments, those skilled in the art will readily appreciate that changes and/or modifications may be made thereto without departing from the spirit and score of the subject disclosure.

LIST OF REFERENCE SIGNS 1 undercarriage
2 track frame
3 platform
4 endless track
5 idler
6 drive sprocket
7 carrier roller
8 bolt
9 fixing hole
10 track roller
11 shaft
12 central portion
13, 14 end portions
15 through-hole
16 roller shell
17, 18 retainer caps
19 sealing arrangement
20 support surface
21 locking element
22 collar
23 through-hole
24 flat axial end face of the collar
25 flat axial end face of the retainer cap 26 keyed connection
27 tube
28 key
29 mounting hole
A1 axial distance of mounting holes
B1 transversal distance of mounting holes
C1 diameter of mounting hole

What is claimed is:

1. A track roller for guiding a track of a tracked vehicle, comprising:
    a shaft extending in an axial direction, the shaft having a central portion and two axial end portions axially adjacent to the central portion on each side, wherein a transversal through-hole is provided in each axial end portion of the shaft;
    a roller shell mounted on the central portion of the shaft in a rotable manner;
    two annular retainer caps fitted to the shaft; and
    sealing arrangements located between each of the retainer caps and the roller shell, wherein
    the shaft is flattened at least in a region of its axial end portions in such a way that at least one support surface which includes the through-hole is provided at each end portion for mounting the track roller to an undercarriage of the tracked vehicle, and the retainer caps are arranged within the central portion of the shaft in their entirety.

2. The track roller of claim 1, wherein the retainer caps are press-fitted to the central portion of the shaft.

3. The track roller of claim 1, wherein a form-locked engagement of the retainer caps and the shaft is provided by a locking element.

4. An undercarriage of a tracked vehicle comprising:
    at least one track frame providing a platform for track rollers;
    a plurality of track rollers affixed to the platform; and
    an endless track guided by the track rollers, wherein the track rollers include the track roller of claim 1, wherein the support surface provides an abutment face for the track roller on the platform.

5. The undercarriage of claim 4, wherein the track rollers are affixed to the platform by two bolts extending through the through-holes in the end portions of the shaft into fixing holes provided in the platform.

6. The undercarriage of claim 4, wherein generally U-shaped collars are arranged circumferentially around the end portions of the shaft, the collars having a through-hole in alignment with the through-hole of the shaft.

7. The undercarriage of claim 6, wherein the collars have a flat axial end face configured for a sliding interaction with a flat axial end face of the retainer caps, in order to absorb axial forces acting on the retainer caps during operation of the undercarriage.

8. The undercarriage of claim 6, wherein the collars are fixed to the end portions at least in an axial direction by the means of a keyed connection.

9. The undercarriage of claim 8, wherein the keyed connection is provided by a tube inserted into the aligned through-holes in the collar and the shaft.

10. The undercarriage of claim 6, wherein the collars are provided with mounting holes extending along the legs of the U-shape for mounting the collars to the platform by a bolted connection.

* * * * *